United States Patent
Brown (10) Patent No.: US 9,523,380 B2
(45) Date of Patent: Dec. 20, 2016

(54) PIPE SUPPORTING METHOD

(71) Applicant: James M. Brown, Richland Hills, TX (US)

(72) Inventor: James M. Brown, Richland Hills, TX (US)

( * ) Notice: Subject to any disclaimer, the term of this patent is extended or adjusted under 35 U.S.C. 154(b) by 252 days.

(21) Appl. No.: 14/535,555

(22) Filed: Nov. 7, 2014

(65) Prior Publication Data
US 2016/0131280 A1     May 12, 2016

(51) Int. Cl.
*F16L 3/00* (2006.01)
*F16B 9/02* (2006.01)
*F16L 3/02* (2006.01)
*B29C 65/48* (2006.01)
*E04D 13/00* (2006.01)
*F16L 3/137* (2006.01)
*F16L 3/223* (2006.01)
*F16L 3/12* (2006.01)

(52) U.S. Cl.
CPC .............. *F16B 9/026* (2013.01); *B29C 65/48* (2013.01); *E04D 13/00* (2013.01); *F16L 3/00* (2013.01); *F16L 3/02* (2013.01); *F16L 3/1218* (2013.01); *F16L 3/137* (2013.01); *F16L 3/223* (2013.01); *Y10T 29/49963* (2015.01); *Y10T 29/49966* (2015.01)

(58) Field of Classification Search
CPC ..... A47B 2097/003; F16L 3/233; F16L 3/223; F16L 3/137; F16L 3/00; F16L 3/02; Y10T 29/49966; Y10T 29/49963; B29C 65/48
See application file for complete search history.

(56) References Cited

U.S. PATENT DOCUMENTS

| | | | |
|---|---|---|---|
| 5,906,341 A | 5/1999 | Brown | |
| 6,076,778 A | 6/2000 | Brown | |
| 6,536,717 B2* | 3/2003 | Parker | F16L 3/11 248/346.01 |
| 7,610,728 B1* | 11/2009 | Manocchia | E02D 27/01 248/357 |
| 2012/0073237 A1* | 3/2012 | Brown | F24F 13/32 52/705 |
| 2012/0168570 A1* | 7/2012 | Smith | F16L 3/00 248/51 |
| 2016/0131280 A1* | 5/2016 | Brown | E04D 13/00 29/525.11 |

* cited by examiner

*Primary Examiner* — Jermie Cozart
(74) *Attorney, Agent, or Firm* — Whitaker Chalk Swindle & Schwartz PLLC; Charles D. Gunter, Jr.

(57) ABSTRACT

A pipe supporting device is used to support an exposed pipe of a roof. The device includes a base having a flat bottom for resting on the roof, an upright member of a length which is connectable to the base and a receiving portion which is connectable to the upright member for receiving and supporting the exposed pipe. The length of the upright member can be altered by a user at a job site to thereby provide a device having a desired overall height. A upright steel reinforcing component is first installed on the roof and the pipe supporting device is then placed over the reinforcing component so that the component is received within a bottom opening provided on the base of the device. The reinforcing component provides additional structural support for the pipe supporting device in extreme environments, such as hurricane zones.

19 Claims, 6 Drawing Sheets

PIPE SUPPORTING METHOD

BACKGROUND OF THE INVENTION

A. Field of the Invention

The present invention relates generally to improvements in support arrangements for exposed pipes and conduits and more specifically, to a support system for an exposed pipe or conduit on the roof of a building, in an attic or mechanical room, or the like, such as, for example, the condensate drain line of an air conditioning unit or an electrical conduit located on the roof of a building.

B. Description of the Prior Art

A variety of devices have been used in the prior art in order to support exposed pipe. Support devices are necessary for a number of reasons, such as to prevent undue strain being placed upon a pipe or coupling. In some cases, it is necessary to support the pipe at a slope with respect to an adjacent support area, such as in the case of condensate drain lines from air conditioning/heating systems, or in the case of sewer pipes and lines.

Commercial buildings often have various types of pipes which are exposed and run along the rooftops of such buildings. For example, it is quite common for air conditioning units to be mounted on a building roof of a commercial building, the air conditioning units having condensate drain pipes which slope from the unit toward an exit point on the rooftop. Other service units are commonly mounted on building roofs which utilize pipes which must be supported, often at a slope with respect to the surrounding rooftop. Modern building code requirements also dictate that pipes be properly supported in attics, mechanical rooms, and the like, in many situations. Electrical conduit must also be supported and mechanically attached on building roofs.

In the past, it was common practice for mechanical and heating/ventilation contractors and roofers to hand saw pieces of wood of the desired height to support air conditioner condensate drain pipes. This procedure is time consuming and labor intensive. It was realized that an adjustable, ready-made device would save time and money.

Applicant's prior U.S. Pat. No. 5,906,341, to James M. Brown, issued May 25, 1999 and U.S. Pat. No. 6,076,778, to James M. Brown, issued Jun. 20, 2000, solved certain of the noted deficiencies of the prior art with respect to pipe supporting devices then available in the marketplace. The Pipe Prop® solved the problem of providing an adjustable height for the support by providing an upright member which could be altered by a user at a job site to thereby provide a device having a desired overall height for supporting an exposed pipe. The Pipe Prop® is made of a tough, durable synthetic plastic that is made to withstand severe weather conditions without buckling, shattering or otherwise deteriorating even in heavy rain, wind, sunlight or hail. The Pipe Prop® product has gained the official Miami-Dade Notice of Acceptance for use in all areas of Florida. The Pipe Prop® is commercially available from Pipe Prop, LLC, 6340 Baker Boulevard, Fort Worth, Tex. 76118.

Despite the improvements offered by the Pipe Prop® product, however, there continued to be a need for improvements in the pipe support arts in order to meet the requirements of certain extreme environmental or weather conditions, and the like. For example, certain areas of the country have specialized building codes for hurricane and tornado prone zones.

The present invention has as its general object to provide a pipe supporting device which is simple in design and economical to manufacture and which can support an exposed pipe at a desired slope with respect to a surrounding support surface, such as a building roof.

The present invention has as a more specific object to provide improvements in the Pipe Prop® product which make it even more weather and wind resistant for use in hurricane and other high wind or storm situations.

Another object of the invention is to provide such a pipe supporting device of standard components which can be mass produced at an economical price but which includes additional reinforcement features, as well as height adjustment features to allow the standard device to be adjusted an overall height to fit the installation location at hand.

SUMMARY OF THE INVENTION

The foregoing objects of the invention are achieved thru the use of an improved Pipe Prop® product and to an improved method of supporting an exposed conduit on a surrounding support surface using the improved product. The method includes the steps of providing a pipe or conduit supporting device beneath a conduit at spaced intervals along the conduit on the surrounding support surface. The pipe or conduit supporting devices are formed of synthetic plastic components, each of which is provided with a base having a flat bottom for resting on the support surface and an upwardly extending receptacle portion having a generally cylindrical upper opening and lower opening.

A first extent of an upright member is installed within the cylindrical upper opening of the upwardly extending receptacle portion of the base, the upright member having a central bore. A saddle shaped receiving portion is fitted onto an opposite extent of the upright member, the saddle shaped receiving portion having a downwardly extending receptacle portion for receiving the opposite extent of the upright member. The saddle shaped receiving portion is used to ultimately support the subject conduit or pipe.

A rigid reinforcement component is first located on the support surface, the rigid reinforcement component having a base region with an upper surface and a lower surface and an upright portion extending upwardly from the upper surface of the base region generally perpendicular thereto. The base region also has a plurality of screw hole openings which communicate the upper and lower surfaces thereof. The rigid reinforcement component is attached to the support surface by applying a suitable adhesive to the lower surface of the base region and then installing a plurality of screws within the screw hole openings and screwing the screws into the support surface.

In the next step of the method of the invention, an adhesive is applied to the flat bottom of the base of each of the pipe or conduit supporting devices. The pipe or conduit supporting devices are then placed over the rigid reinforcement components so that the upright portion of each rigid reinforcement component is received within the lower opening of the base of a respective pipe or conduit supporting device, whereby the rigid reinforcement component provides additional strength and stability to the pipe or conduit supporting device.

In a particularly preferred form of the method of the invention, the pipe or conduit supporting devices are used for supporting an exposed condensate drain pipe from an air conditioning unit located on a surrounding roof support surface. A pipe supporting device is provided beneath the pipe or at spaced intervals along the pipe on the surrounding roof support surface. The pipe supporting device is again formed of synthetic plastic components including an injection molded, plastic base having a flat bottom for resting on the roof and an upwardly extending receptacle portion having a generally cylindrical upper opening and lower opening. The the pipe supporting device also has a plurality of outwardly extending gussets which join the base and upwardly extending receptacle portion.

A first extent of an upright member formed from a selected length of hollow PVC pipe is installed within the cylindrical upper opening of the upwardly extending receptacle portion of the base, the upright member having a central bore. An injection molded, saddle shaped pipe receiving portion is fitted onto an opposite extent of the upright member, the saddle shaped receiving portion having an upper portion shaped as a concave recess and having a downwardly extending receptacle portion for receiving the opposite extent of the upright member.

A rigid steel reinforcement component is attached on the roof support surface, the rigid steel reinforcement component having a base region with an upper surface and a lower surface and an upright portion extending upwardly from the upper surface of the base region generally perpendicular thereto. The base region also has a plurality of screw hole openings which communicate the upper and lower surfaces thereof.

The rigid steel reinforcement component is first attached to the roof support surface by applying a suitable adhesive to the lower surface of the base region and then installing a plurality of screws within the screw hole openings and screwing the screws into the roof support surface.

Next, an adhesive is applied to the flat bottom of the base of each of the pipe support devices and the pipe support devices are placied over the rigid reinforcement component so that the upright portion of the rigid reinforcement component is received within the lower opening of the base of each of the respective pipe supporting devices, whereby the rigid reinforcement component provides additional strength and stability to the pipe supporting devices.

Most preferably, the upright portion of the rigid reinforcement member is also closely received within at least a portion of the length of the central bore of the upright member. Also, the bases of the pipe supporting devices are preferably provided with a plurality of holes passing therethrough between the bottom surface and a top surface thereof, and wherein a sufficient quantity of the adhesive is applied to the bottom surfaces thereof to allow the adhesive to pass through the holes in the base and extrude outwardly on the top surface to form a locking tab region on the top surface of the base.

Additional objects, features and advantages will be apparent in the written description which follows.

DETAILED DESCRIPTION OF THE INVENTION

The preferred version of the invention presented in the following written description and the various features and advantageous details thereof are explained more fully with reference to the non-limiting examples included in the accompanying drawings and as detailed in the description which follows. Descriptions of well-known components and processes and manufacturing techniques are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 4:
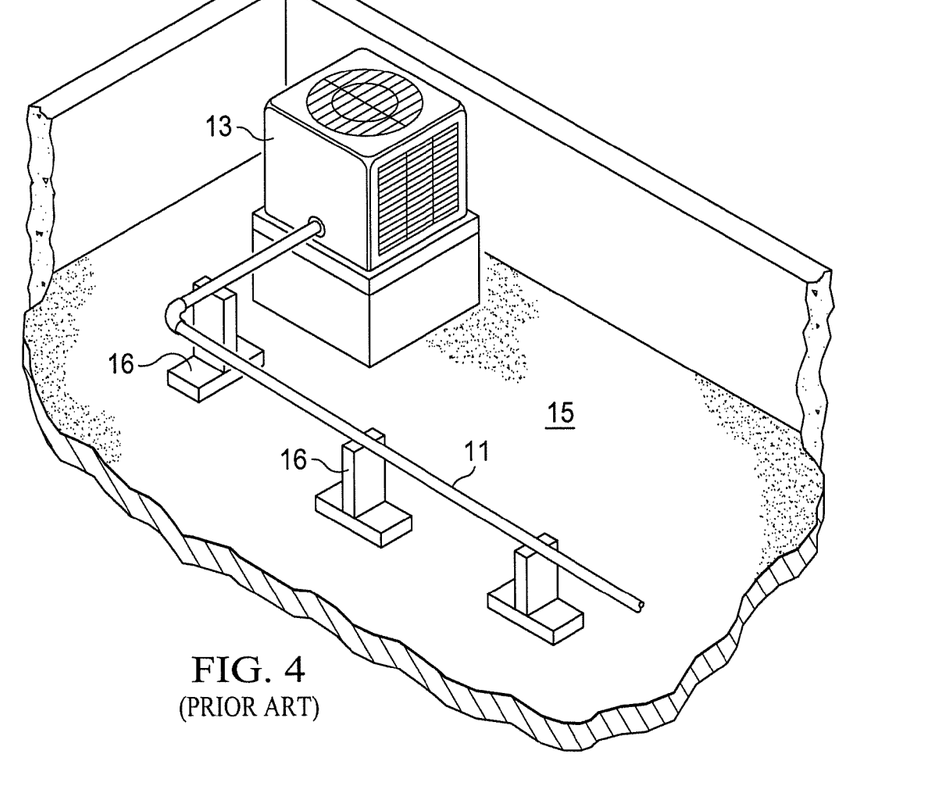
FIG. 4 is a perspective view, similar to FIG. 1, showing the prior art technique of using wood blocks to support an air conditioning condensate drain line on a roof.

In order to better understand the general environment of the present invention, reference will first be had to FIG. 4 of the drawings which shows a traditional installation in which a pipe 11 from an air conditioning unit 13, mounted on the roof of a building 15, extends across the roof to a desired location (not shown) where it exits over the side of the roof, through the roof, or is connected to other roof-mounted equipment. One traditional way of supporting such pipes was by sawing blocks of wood to a desired height and installing the blocks of wood beneath the condensate drain line, usually providing a downward slope to the line. As explained in the Background discussion, this procedure is time consuming and labor intensive. It came to be realized that a lightweight, adjustable, ready-made pipe supporting device would save contractors time and money.

As has been briefly discussed, the Pipe Prop® product described in prior U.S. Pat. No. 5,906,341, to James M. Brown, issued May 25, 1999 and U.S. Pat. No. 6,076,778, to James M. Brown, issued Jun. 20, 2000, solved certain of the noted deficiencies of the prior art by providing an adjustable height for the pipe supporting devices which height could be altered by a user at a job site to thereby provide a device having a desired overall height for supporting an exposed pipe. The Pipe Prop® is also made of a tough, durable synthetic plastic material that is strong but also lightweight.

While the invention will be described primarily in the discussion which follows with respect to roof mounted installations, it will be understood that the devices of the invention could also be used in ground locations, in attics, and other conventional locations where a need exists for pipe support. The roof installations illustrated are particularly well suited for use with the devices of the invention because of the relatively light weight and yet stable construction of the devices. Also, while the following description of the preferred form of the invention uses the term "pipe supporting devices", it will be understood that, in some circumstances "conduit" such as electrical conduit, or other elongate materials might be supported by the devices of the invention, as well. Thus, the terms "conduit" and "pipe" are used interchangeably in the discussion which follows.

As described in the Background, and illustrated in the prior art example shown in FIG. 4 of the drawings, traditionally air conditioner condensate pipes have been supported by a workman cutting pieces of wood 16 to an approximate desired length and placing them beneath the run of pipe. As has been mentioned, this type solution to the problem at hand was time consuming and often resulted in less than a stable support. The wood could deteriorate and rot over time.

Figure 1:
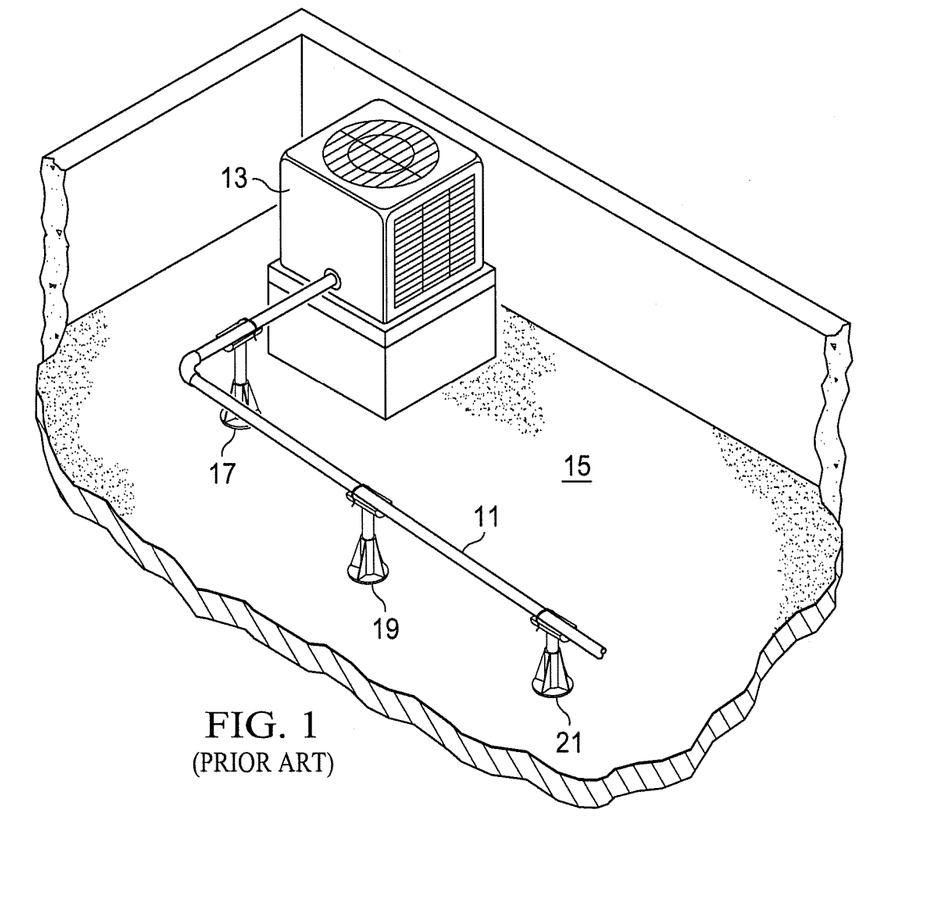
FIG. 1 is a perspective view, partly broken away, showing an air conditioning unit on a building roof, the unit having a condensate drain pipe which is supported by a prior art Pipe Prop® pipe supporting device of the type commercially available in the marketplace.
Figure 2:
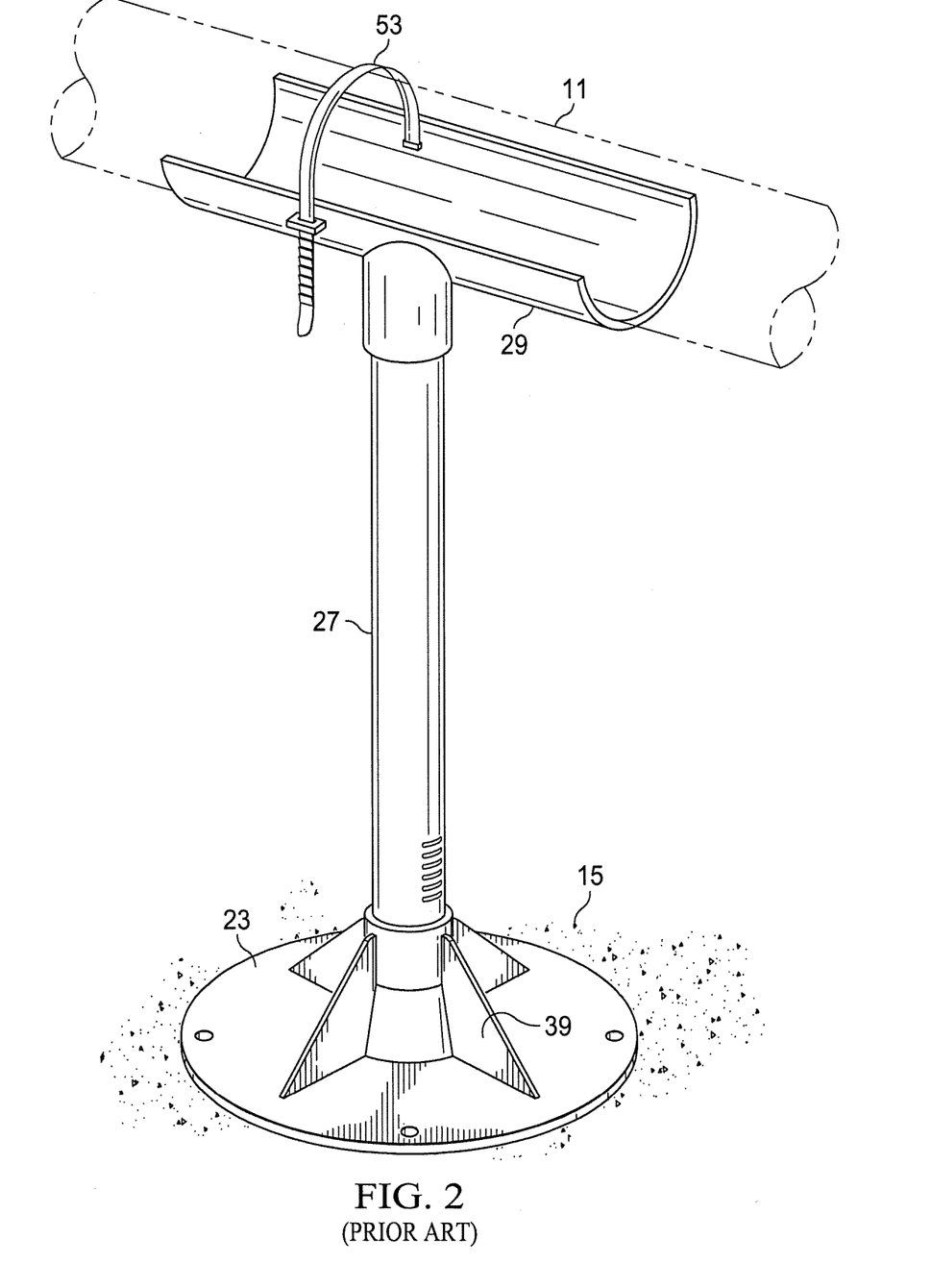
FIG. 2 is an isolated, close-up perspective view of one of a prior art Pipe Prop® pipe supporting device, showing a pipe being supported thereby, the pipe being shown in phantom lines.
Figure 3:
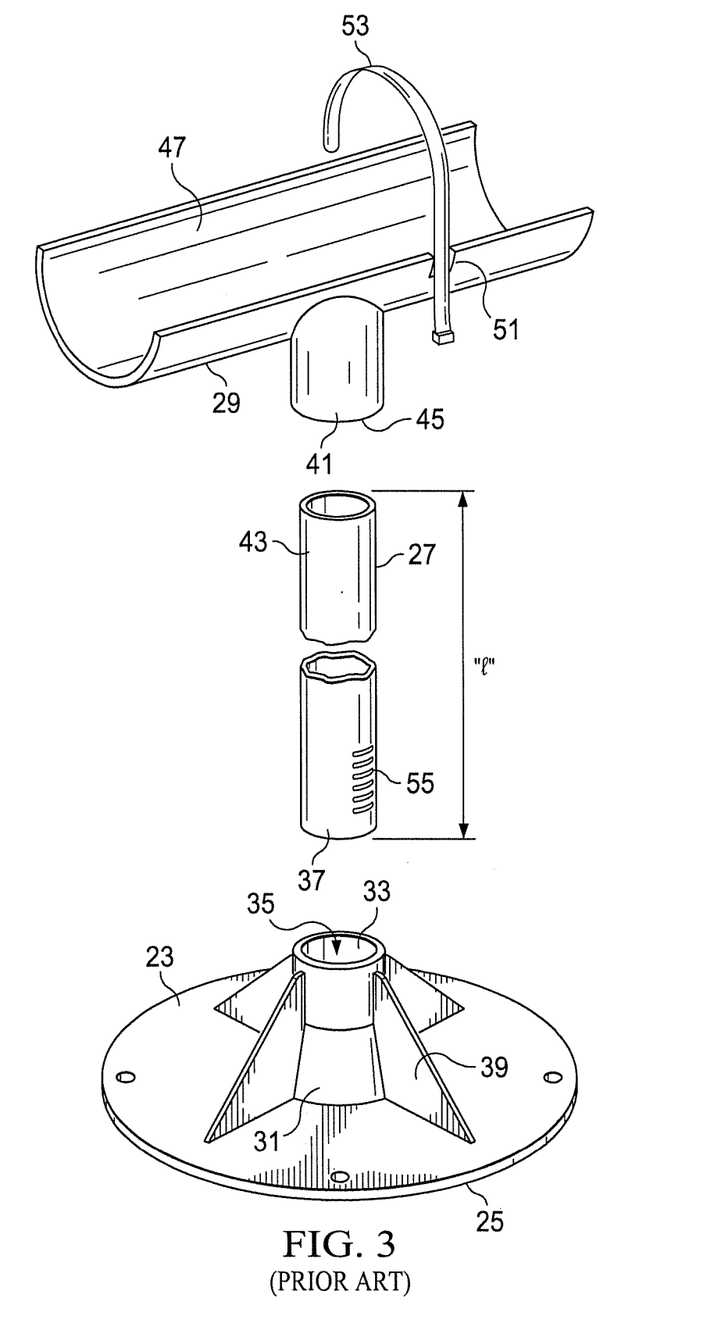
FIG. 3 is an isolated, exploded view of the prior art pipe supporting device of FIG. 2 showing the component parts thereof.

FIGS. 1-3 illustrate the original Pipe Prop® system toward which the present invention is directed. In order to appreciate the improved features of the invention, it will be necessary to first briefly describe the prior art product. The prior art pipe supporting devices (such as the device 17 in FIG. 1) are positioned on a surrounding substrate, such as the roof 15 in FIG. 1, to support the pipe 11 as it extends along the roof and would take the place of the pieces of wood 16 shown in FIG. 4. The number of supporting devices needed will depend upon the type of the pipe supported, its size, weight, overall dimensions, and the material from which it is made, as well as the particular layout employed on the roof. In general, for air conditioning systems of the type shown, it will be desirable to support the pipe with a gradual slope from the air conditioning unit in the direction of the point at which the pipe extends over the side of the roof or otherwise exits the rooftop. Thus, in the embodiment of the invention shown in FIG. 1, the overall height of the pipe supporting devices will decrease in height from left to right as viewed in FIG. 1.

As best seen in FIG. 3, the prior art pipe supporting devices each included a base 23 having a generally round and flat bottom 25 for resting on the roof 15. An upright member 27 of a first selected length ("1" in FIG. 3) is connectable to the base 23. A receiving portion designated generally as 29 in FIG. 3, is connectable to the upright member 27 and is adapted to receive and support the exposed pipe 11.

As shown in FIG. 3, the base 23 preferably includes an upwardly extending connector portion 31, which in this case is an upright cylindrical member having an end opening 33. The upwardly extending connector portion 31 has an initially open, generally cylindrical upper opening 35 for receiving a first extent 37 of the upright member 27. A plurality of gussets 39 are arranged on the base bottom 25. Each gusset comprises a triangular reinforcing brace for reinforcing the upwardly extending connector portion 31. In the preferred embodiment shown, there are four gussets 39 arranged at equi-angular positions about the upwardly extending connector portion 31 on the base bottom 35. The base 23, as well as the receiving portion 29, can be conveniently injection molded of a suitable plastic material, such as polyvinylchloride plastic (PVC) or other material resistant to wind, weather and aging, such as an ASA material (acrylonitrile styrene acrylate).

The upright member 27 can also conveniently be provided as a length of PVC pipe, if desired, which is commercially available from a number of sources. The upright member 27 shown in FIGS. 2 and 3 is ¾ inch I.D. where the pipe supporting device is intended to support the condensate drain pipe of an air conditioning unit mounted on a roof.

The saddle shaped receiving portion 29 has a downwardly extending connector portion 41 which is connectable with the opposite extent 43 of the upright member 27 to complete the assembly. As shown in FIG. 3, the downwardly extending connector portion is a cylindrical member having an end opening 45 which is similar to end opening 33 in the base 23 for receiving and securely engaging the upright member 27. The component parts of the device, shown in FIG. 3, are typically glued together using, for example, a commercially available PVC glue or cement. In other words, the upright 27 is glued within the end opening 45 of the saddle shaped receiving portion 29 and within the end opening 33 in the base 23.

The receiving portion 29 also has a concave receiving recess 47 for receiving the pipe 11 to be supported. The concave recess 47 is available in sizes ranging from about ½ inch I.D. to a maximum of 1½ inch I.D. for supporting the drain pipes of air conditioning units. A flexible engagement element, such as the tie wrap 53 is connectable with the saddle shaped receiving portion 29, as by a slot, 51, provided therein, whereby a pipe which is received and supported within the receiving recess 47 can be securely engaged within the receiving portion. The tie wrap passes about the exterior of the pipe and saddle shaped receiving portion and is held in place by the slot 51 shown in FIG. 3.

The first selected length of the upright member 27 can be altered by a user at the job site to thereby provide a pipe supporting device having a desired overall height for supporting the exposed pipe 11 at a desired height on the roof. Preferably, the upright member 27 is provided with graduations 55 along the length thereof and is alterable by severing the length thereof at a selected graduation. In the case of a PVC pipe, this can be conveniently accomplished by sawing the member with a saw, cutting the member with a cutting tool or by breaking the member at a frangible region provided therein. By whatever means, it is only necessary that the user be able to alter the overall length of the upright member 27 at the job site in order to provide a pipe supporting device of a desired overall height to fit the intended location of use. In the case of the air conditioner 13 shown in FIG. 1, the condensate drain line 11 is provided with a gradual downward slope as it exits the air conditioner by supplying pipe supporting devices of gradually diminishing height so that condensate easily drains from the air conditioner to a drain point on the roof.

FIG. 2 is a close-up view of the first pipe supporting device (17 in FIG. 1) shown on the rooftop 15, the overall length of the upright member 27 being greater than the overall length of the upright member provided for devices 19 and 21.

In use, the pipe supporting devices of the invention are installed beneath the pipe to be supported at spaced intervals along the pipe. The flat bottom portion of the base rests upon the associated support structure to provide stability for the device and ensure the firm engagement of the pipe to be supported. The overall height which is desired is determined and the upright member 27 is altered to the desired dimensions by severing the upright member at the appropriate graduation 55. The upright member is then installed within the receptacles of the respective connector portions 31, 41 and glued in place and the pipe is received within the recess 47 of the receiving portion 29. The pipe can be secured in place with a tie wrap 53 which is passed about the pipe exterior and secured after being passed through the openings 49, 51.

Figure 5:
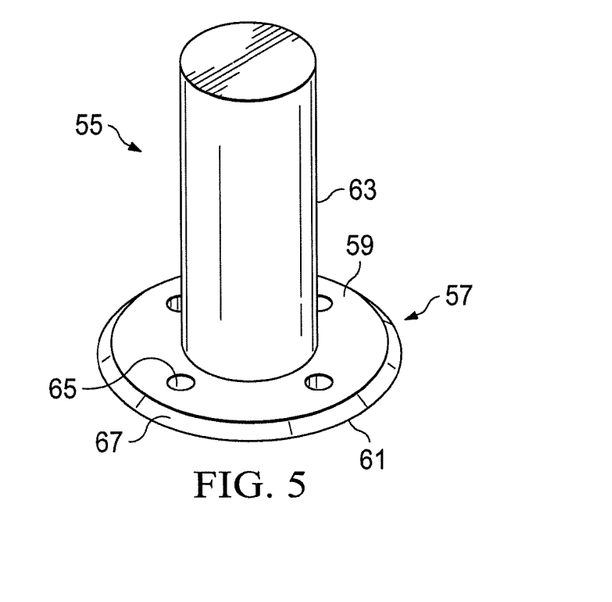
FIG. 5 is an isolated view of a preferred reinforcing component used in the improved pipe supporting system of the invention.

As has been explained, while the traditional Pipe Prop® product provides more than adequate structural integrity and wind resistance for most applications, there are some extreme environment conditions that make additional strucrural reinforcement of the devices advisable. With reference to FIG. 5, there is shown a reinforcing component, designated generally as 55, which is used to provide additional structural reinforcement for the pipe supporting devices of the invention. The reinforcing component 55 is formed of a rigid material, such as a rigid metal, preferably steel. In some circumstances, it may be possible to employ another class of rigid materials, such as a rigid plastic or composite material.

As can be seen in FIG. 5, the reinforcing component 55 has a circular base region 57 with an upper surface 59 and a lower surface 61 and an upright portion 63 extending upwardly from the upper surface 59 of the base region generally perpendicular thereto. The base region 57 also has a plurality of screw hole openings (such as opening 65) which communicate the upper and lower surfaces thereof. It will also be appreciated from FIGS. 5 and 7, that the base region 57 outmost circumference is tapered in a downwardly sloping chamfer. The chamfer 67 (as best seen in FIG. 7, is machined to be precisely and closely received within a lower opening in the base portion of the device, as will be more fully explained.

Figure 6:
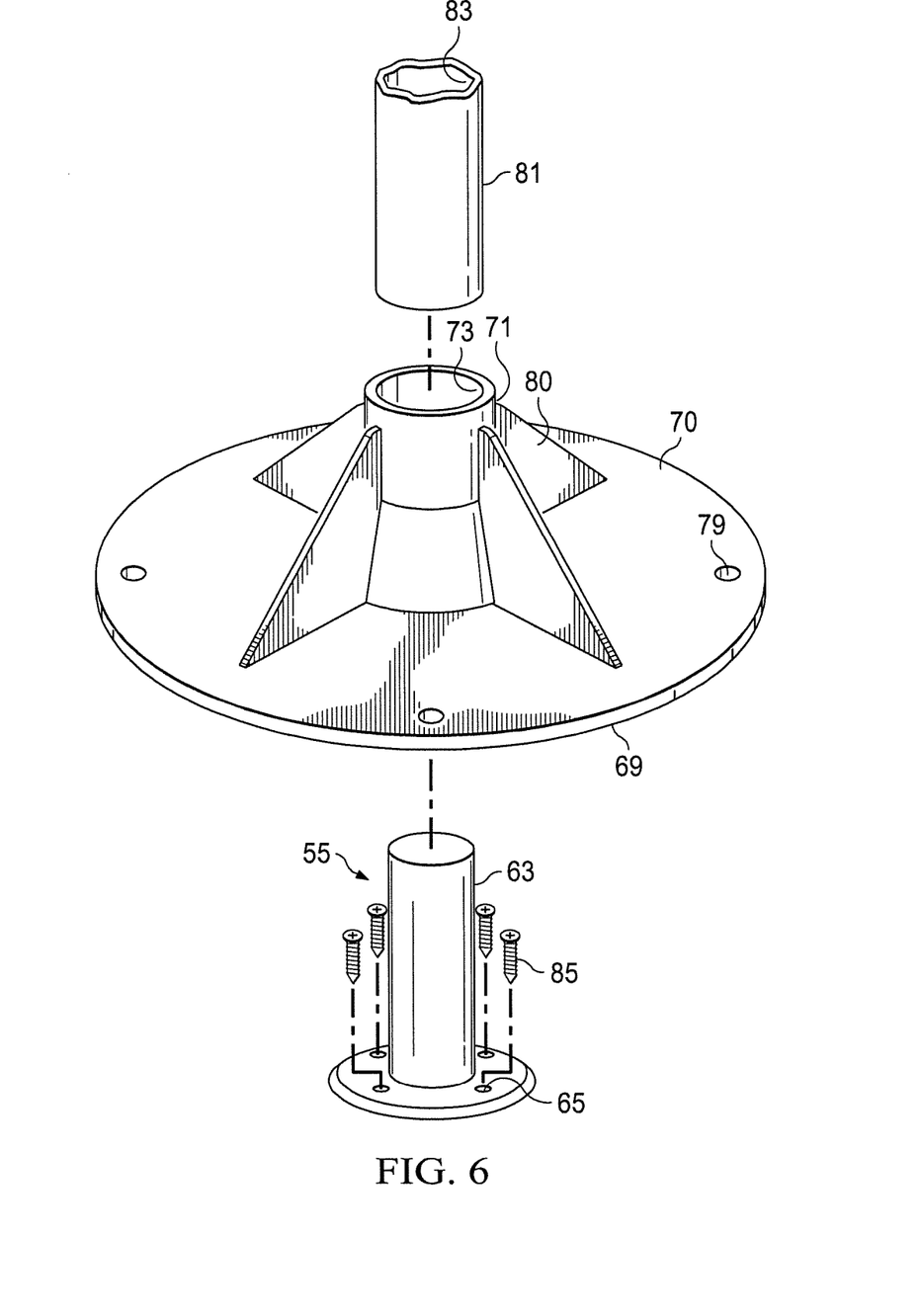
FIG. 6 is an exploded view of the base of a pipe supporting device of the invention showing the installation of the reinforcing component within an opening in the base of the pipe supporting device, a portion of the upright member of the device being shown partly broken away.
Figure 7:
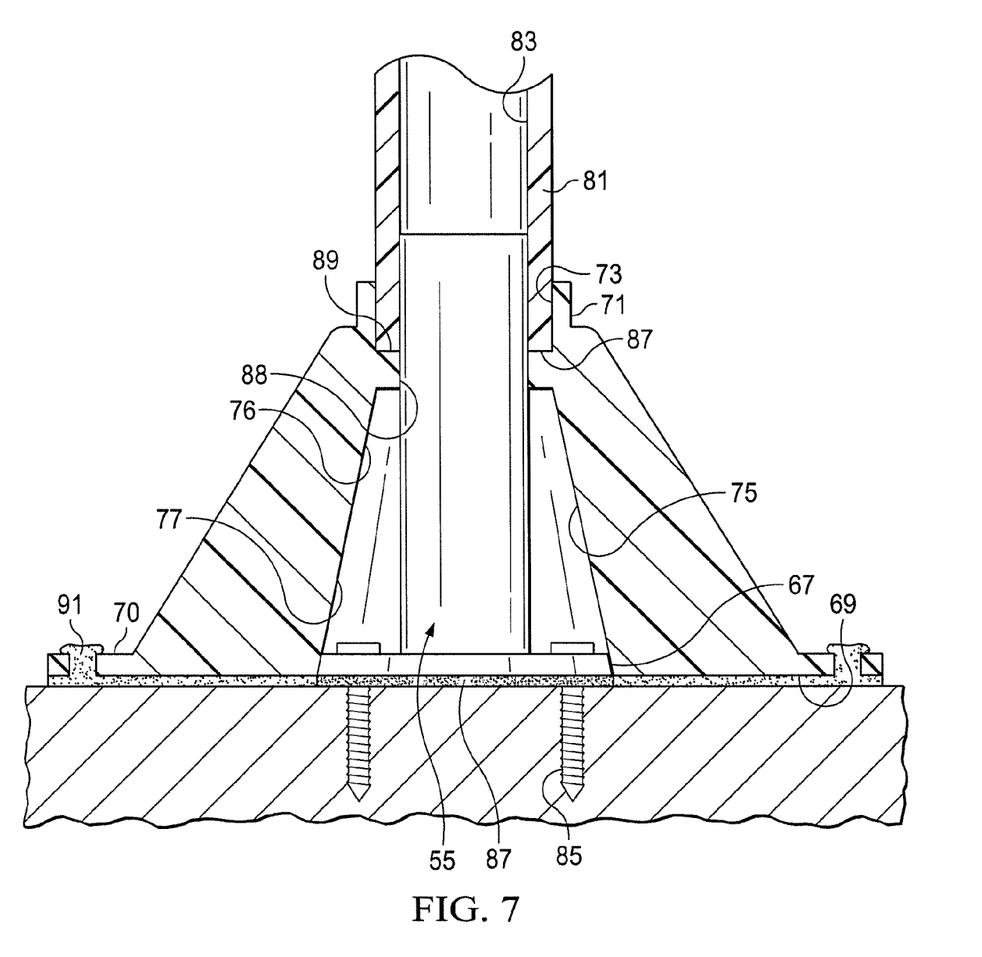
FIG. 7 is a side, partial cross-sectional view of the base region of the pipe supporting device of the invention, showing the principal components thereof.

FIGS. 6 and 7 explain the steps involved in the installation method of the improved pipe supporting devices of the invention. As has been explained, the method is used for supporting an exposed conduit on a surrounding support surface, such as the roof of a building. In the improved method of the invention, a plurality of conduit supporting devices are placed beneath the conduit at spaced intervals along the conduit on the surrounding support surface. Each of the conduit supporting devices can generally take the shape of the previously described components and be formed of synthetic plastic components including a base having a flat bottom (69 in FIG. 6) for resting on the support surface and an upwardly extending receptacle portion 71 having a generally cylindrical upper opening 73 and lower opening 75. As can be seen in FIG. 7, the lower opening has sidewalls which flare outwardly from a top region 76 to a bottom region 77 thereof.

The receptacle portion 71 is also preferably provided with a series of angled flutes or gussets 80 to add strength and stability to the receptacle portion of the device. Each gusset comprises a triangular reinforcing brace for reinforcing the upwardly extending receptacle portion of the device. In the preferred embodiment shown, there are four gussets 80 arranged at equi-angular positions about the upwardly extending receptacle portion on the base. The base will also preferably be provided with a plurality of holes 79 around the outer circumference thereof which provide communication between the bottom surfaces 69 and upper surfaces 70 thereof.

In the method of the invention, a first extent of an upright member 81 is installed within the cylindrical upper opening 73 of the upwardly extending receptacle portion 71 of the base, the upright member having a central bore. A saddle shaped receiving portion, such as the previously described portion 29 in FIG. 1, is fitted onto an opposite extent of the upright member, the saddle shaped receiving portion having a downwardly extending receptacle portion (such as portion 41 in FIG. 3) for receiving the opposite extent of the upright member. The upright member, saddle shaped receiving portion and upwardly extending receptacle portion of the base are joined together by gluing the respective synthetic plastic components together at a worksite using a suitable plastic glue or cement.

The previously described rigid reinforcement component (55 in FIG. 5) is first installed on the support surface. This is preferably accomplished by attaching the rigid reinforcement component to the support surface by applying a suitable adhesive to the lower surface 61 of the base region 57 and then installing a plurality of screws (such as screws 85 in FIG. 6) within the screw hole openings and screwing the screws into the support surface. The layer of adhesive can be seen at 87 in FIG. 7. Although a number of adhesives might be employed, one approved adhesive is the Millennium LPS® single component elastomeric, polyurethane sealant available from ADCO Roofing Products, Michigan Center, Mich. Another class of adhesives which have been used are the solvent type acrylic cements, such as a LPS Weld-On™ cement adhesive.

Next, an adhesive is applied to the flat bottom (69 in FIG. 6) of the base of the conduit support device and the conduit support device is placed over the rigid reinforcement component 55 so that the upright portion of the rigid reinforcement component is received within the lower opening (generally at 75) of the base of the conduit support device. It can be seen in FIG. 7 that a portion of the sidewalls of the rigid reinforcement component pass through and contact a circumferential ring area 88 in the interior opening of the base upper extending receptacle portion 71. The rigid reinforcement component provides additional strength and stability to the conduit support device. It will also be appreciated from FIG. 7 that the upright portion of the rigid reinforcement member 55 is also closely received within at least a portion of the length of the central bore 83 of the upright member 81. The upright member 81 has a lower extent 87 which rests upon a circumferential ledge 89 formed in the upwardly extending receptacle portion 71 of the base of the device above the circumferential ring area 88.

As will be appreciated from FIG. 7, a sufficient quantity of the adhesive is preferably applied to the bottom surfaces 69 of the bases of the devices to allow the adhesive to pass through the holes in the base and extrude outwardly on the top surface to form a locking tab region (such as region 91 in FIG. 7) on the top surface 70 of the base. The locking tab type arrangement which results from the extruded adhesive has been found to provide greatly improved stability to the pipe support, assisting it in withstanding high force winds on roofs, for example.

The invention has been largely described in terms of providing a reinforced pipe prop device for use in those areas of the country in which extreme weather conditions occur, such as hurricanes and tornadoes. However, the device also offers another distinct advantage which will be apparent by referring again to FIG. 7 of the drawings. It will be noted that the rigid reinforcement component has screw holes in the base thereof for receiving the screws 85 for securing the component to the roof or other surrounding substrate. The mechanical attachment created by the presence of the screws 85 is required to meet certain building codes. However, they also present a point of a possible leak in the roof.

In the case of the improved device of the invention, however, the screws 85 are contained within the lower opening (75 in FIG. 7) of the upwardly extending receptacle portion 71 of the device. In other words, the screws 85 are covered and protected within the enclosure created by the internal opening 75. Because the upright member 81 is glued within the opening 73, the enclosure created by the internal opening 75 in the base is watertight. This eliminates the possibility of a leak and also eliminates the need to build a "dam" around the base of the device with roofing sealant, as would likely be necessary if holes were simply drilled in the surface 70 of the base, or if the openings shown at 91 in FIG. 7 were used as screw holes.

The device of the invention also offers a number of other advantages. The pipe supporting device of the invention is simple in design and economical to manufacture. If desired, each of the structural components of the device can be molded or extruded from PVC or other commercially available plastic materials, such as ABS. The tie straps can be of any convenient flexible plastic material. The adjustable upright member of the pipe supporting device allows the overall height of the device to be adjusted for supporting an exposed pipe at any of a number of desired heights on a roof or other surrounding support structure. A series of graduations provides a convenient means for determining the overall length of the upright member. Since the upright member is comprised of synthetic plastic type material, it can be easily cut or sawed to the desired length. This allows a standard sized pipe supporting device to be mass produced which can be altered in overall height to the requirements of a particular job while on the job site. The device is simple to install and saves time over prior art practices, such as cutting and assembling wooden boards to the required heights.

The special rigid steel reinforcing component of the base, as well as the unique attachment method of the base and reinforcing component to the building roof, offer greatly improved structural characteristics and wind resistance for special environmental areas, such as hurricane prone areas of the country.

While the invention has been shown in only one of its forms, it is not thus limited but is susceptible to various changes and modifications without departing from the spirit thereof.

What is claimed is:

1. A method of supporting an exposed conduit on a surrounding support surface, the method comprising the steps of:
    providing a conduit supporting device beneath the conduit at spaced intervals along the conduit on the surrounding support surface, each of the conduit supporting devices being formed of synthetic plastic components having a base with a flat bottom for resting on the support surface and an upwardly extending receptacle portion having a generally cylindrical upper opening and lower opening;
    installing a first extent of an upright member within the cylindrical upper opening of the upwardly extending receptacle portion of the base, the upright member having a central bore;
    fitting a saddle shaped receiving portion onto an opposite extent of the upright member, the saddle shaped receiving portion having a downwardly extending receptacle portion for receiving the opposite extent of the upright member;
    locating a rigid reinforcement component on the support surface, the rigid reinforcement component having a base region with an upper surface and a lower surface and an upright portion extending upwardly from the upper surface of the base region generally perpendicular thereto, the base region also having a plurality of screw hole openings which communicate the upper and lower surfaces thereof;
    attaching the rigid reinforcement component to the support surface by applying a suitable adhesive to the lower surface of the base region and then installing a plurality of screws within the screw hole openings and screwing the screws into the support surface;
    applying an adhesive to the flat bottom of the base of the conduit support device and placing the conduit support device over the rigid reinforcement component so that the upright portion of the rigid reinforcement component is received within the lower opening of the base of the conduit support device, whereby the rigid reinforcement component provides additional strength and stability to the conduit support device.

2. The method of claim 1, wherein the upright portion of the rigid reinforcement member is also closely received within at least a portion of the length of the central bore of the upright member.

3. The method of claim 1, whererin the upright member, saddle shaped receiving portion and upwardly extending receptacle portion of the base are afixed by gluing the respective synthetic plastic components together at a worksite.

4. The method of claim 3, further comprising the steps of altering the length of the upright member at other of the spaced intervals along the exposed condluit, to thereby provide a device having a desired overall height for supporting the exposed conduit at a desired degree of slope on the adjacent support surface.

5. The method of claim 4, wherein the length of the upright member is altered by severing the length thereof to an approximate desired height of the conduit supporting device and wherein a final desired height of the conduit supporting device is obtained by adjusting the length of the extent residing within either or both receptacle portions, the upright being glued at the final desired height.

6. The method of claim 1, wherein the synthetic plastic components are selected from the group consisting of polyvinylchloride and acrylonitrile styrene acrylate plastics.

7. The method of claim 1, wherein the rigid reinforcement component is formed of a rigid metal.

8. The method of claim 7, wherein the rigid reinforcement component is formed of steel.

9. The method of claim 1, wherein a flexible engagement element is used for engaging and securing a portion of a pipe which is received and supported within the saddle shaped receiving portion of the conduit supporting device.

10. The method of claim 9, wherein the engagement element is a flexible tie wrap and wherein at least one opening is provided in the saddle shaped receiving portion of the device for connecting the tie wrap.

11. The method of claim 1, wherein the bases of the conduit supporting device are provided with a plurality of holes passing therethrough between the bottom surface and a top surface thereof, and wherein a sufficient quantity of the adhesive is applied to the bottom surfaces thereof to allow the adhesive to pass through the holes in the base and extrude outwardly on the top surface to form a locking tab region on the top surface of the base.

12. A method of supporting an exposed condensate drain pipe from an air conditioning unit located on a roof support surface, the method comprising the steps of:
    providing a pipe supporting device beneath the pipe at spaced intervals along the pipe on the roof support surface, each of the pipe supporting devices being formed of synthetic plastic components having a base with a flat bottom for resting on the roof and an upwardly extending receptacle portion having a generally cylindrical upper opening and lower opening;
    installing a first extent of an upright member within the cylindrical upper opening of the upwardly extending receptacle portion of the base, the upright member having a central bore;
    fitting a saddle shaped receiving portion onto an opposite extent of the upright member, the saddle shaped receiving portion having a downwardly extending receptacle portion for receiving the opposite extent of the upright member;

locating a rigid reinforcement component on the roof support surface, the rigid reinforcement component having a base region with an upper surface and a lower surface and an upright portion extending upwardly from the upper surface of the base region generally perpendicular thereto, the base region also having a plurality of screw hole openings which communicate the upper and lower surfaces thereof;

attaching the rigid reinforcement component to the roof support surface by applying a suitable adhesive to the lower surface of the base region and then installing a plurality of screws within the screw hole openings and screwing the screws into the roof support surface;

applying an adhesive to the flat bottom of the base of the pipe support device and placing the pipe support device over the rigid reinforcement component so that the upright portion of the rigid reinforcement component is received within the lower opening of the base of the pipe supporting device, whereby the rigid reinforcement component provides additional strength and stability to the pipe supporting device.

13. A method of supporting an exposed condensate drain pipe from an air conditioning unit located on a surrounding roof support surface, the method comprising the steps of:

providing a pipe supporting device beneath the pipe at spaced intervals along the pipe on the surrounding roof support surface, each of the pipe supporting devices being formed of synthetic plastic components including an injection molded, plastic base with a flat bottom for resting on the roof and an upwardly extending receptacle portion having a generally cylindrical upper opening and lower opening, the pipe supporting device also having a plurality of outwardly extending gussets which join the base and upwardly extending receptacle portion;

installing a first extent of an upright member formed from a selected length of hollow PVC pipe within the cylindrical upper opening of the upwardly extending receptacle portion of the base, the upright member having a central bore;

fitting an injection molded, saddle shaped pipe receiving portion onto an opposite extent of the upright member, the saddle shaped receiving portion having an upper portion shaped as a concave recess and having a downwardly extending receptacle portion for receiving the opposite extent of the upright member;

locating a rigid reinforcement component on the roof support surface, the rigid reinforcement component having a base region with an upper surface and a lower surface and an upright portion extending upwardly from the upper surface of the base region generally perpendicular thereto, the base region also having a plurality of screw hole openings which communicate the upper and lower surfaces thereof;

attaching the rigid reinforcement component to the roof support surface by applying a suitable adhesive to the lower surface of the base region and then installing a plurality of screws within the screw hole openings and screwing the screws into the roof support surface;

applying an adhesive to the flat bottom of the base of the pipe support device and placing the pipe support device over the rigid reinforcement component so that the upright portion of the rigid reinforcement component is received within the lower opening of the base of the pipe supporting device, whereby the rigid reinforcement component provides additional strength and stability to the pipe supporting device.

14. The method of claim 13, wherein the upright portion of the rigid reinforcement member is also closely received within at least a portion of the length of the central bore of the upright member, forming a watertight seal and wherein the screws and screw hole openings in the rigid reinforcement component are covered by and received within the lower opening of the base of the pipe support device, whereby a watertight enclose is formed over the screws and screw holes.

15. The method of claim 14, whererin the upright member, saddle shaped receiving portion and upwardly extending receptacle portion of the base are afixed by gluing the respective synthetic plastic components together at a worksite.

16. The method of claim 15, wherein the synthetic plastic components are selected from the group consisting of polyvinylchloride and acrylonitrile styrene acrylate plastics.

17. The method of claim 16, wherein the rigid reinforcement component is formed of a rigid metal.

18. The method of claim 17, wherein the rigid reinforcement component is formed of steel.

19. The method of claim 18, wherein the bases of the pipe supporting devices are provided with a plurality of holes passing therethrough between the bottom surface and a top surface thereof, and wherein a sufficient quantity of the adhesive is applied to the bottom surfaces thereof to allow the adhesive to pass through the holes in the base and extrude outwardly on the top surface to form a locking tab region on the top surface of the base.

* * * * *